United States Patent Office 3,206,509
Patented Sept. 14, 1965

3,206,509
TRIBROMOACETAMIDES
Richard A. Nyquist and Richard D. McLachlan, Midland, Mich., assignors to The Dow Chemical Company, Midland, Mich., a corporation of Delaware
No Drawing. Filed Apr. 22, 1964, Ser. No. 361,870
6 Claims. (Cl. 260—561)

This is a continuation-in-part of our copending application Serial No. 222,680, filed September 10, 1962, and now abandoned.

The present invention is directed to the novel N-alkyl-2,2,2-tribromoacetamide compounds corresponding to the formula $$R-N(H)-C(=O)-C(Br)_2-Br$$

wherein R is an alkyl group being of from one to eight, inclusive, carbon atoms. The compounds are crystalline solids of low to moderate solubility in many common organic solvents such as acetone and benzene and of low solubility in water.

The new compounds are prepared by reacting a tribromoacetyl halide with an alkylamine having the formula $$R-NH_2$$

in the presence of an acid binding or neutralizing agent or hydrogen halide acceptor. Conveniently, the reacting is carried out in an inert liquid reaction medium, for example, a hydrocarbon liquid, hexane, dichloromethane, 1,2-dibromoethane, or carbon tetrachloride. The amounts of the reagents to be employed are not critical, some of the desired product being obtained when employing any proportion of the reactants. Good results are obtained when employing equimolecular proportions of the reactants, however, it is convenient and therefore preferred to employ one molecular proportion of the tribromoacetyl halide and two or more molecular proportions of the alkylamine, the latter thereby serving as both reactant and hydrogen halide acceptor. The reaction takes place smoothly at temperatures of from −20 to 35° C. with the production of the desired product and salt of reaction.

In carrying out the reaction, the reactants are mixed and contacted together in any convenient fashion and the resulting mixture maintained for a period of time in the reaction temperature range to complete the reaction. Upon completion of the reaction, the product compound can be separated in various manners. In one such operation, the reaction medium is hot-filtered to remove therefrom the salt of reaction. The resultant filtrate is then cooled to obtain the desired product as a precipitate.

The following example illustrates the invention but is not to be considered as limiting it.

*Example*

Tribromoacetyl chloride (2.0 grams; 0.0063 mole) and 50 milliliters of hexane are mixed together; to the resulting mixture is added slowly portionwise and with stirring two milliliters of tert-butylamine (equivalent to 1.4 grams; 0.019 mole). The addition is carried out at room temperature over a period of thirty minutes. The mixture is thereafter heated to boiling, about 75° C. The heated mixture is filtered, the filtrate cooled to a temperature of about −20° C., and the cooled mixture filtered to obtain a white crystalline 2,2,2-tribromo-N-tert-butylacetamide product melting at 115.5° C.

In a similar manner, the other products of the present invention are prepared. Representative such compounds include:

2,2,2-tribromo-N-methylacetamide (having a molecular weight of 309.8) by reacting together methylamine and tribromoacetyl chloride.

2,2,2-tribromo-N-hexylacetamide (molecular weight of 380.0) by reacting together hexylamine and tribromoacetyl chloride.

2,2,2-tribromo-N-ethylacetamide (having a molecular weight of 323.8 and melting at about 70.2° C.) by reacting together ethylamine and tribromoacetyl chloride.

2,2,2 - tribromo - N - 1,1,3,3 - tetramethylbutylacetamide (having a molecular weight of 408.0) by reacting together 1,1,3,3-tetramethylbutylamine (boiling at about 137° to 138° C.) and tribromoacetyl bromide.

2,2,2 - tribromo -N - tert - pentylacetamide (molecular weight of 365.9) by reacting together tert-pentylamine (boiling at from 77° to 79° C.) and tribromoacetyl chloride.

2,2,2-tribromo-N-isopropylacetamide (melting at about 80.0° C.) by reacting together isopropylamine and tribromoacetyl chloride.

2,2,2-tribromo-N-butylacetamide (having a molecular weight of 351.9) my reacting together butylamine and tribromoacetyl chloride.

2,2,2-tribromo-N-octylacetamide (molecular weight of 408.0) by reacting together octylamine (melting at about −0.4° C.) and tribromoacetyl chloride.

The new compounds of the present invention are useful as parasiticides, and, by judicious employment, can be used as selective parasiticides, for the control of a number of plant, helminth, mite, insect, bacterial, and fungal organisms. For such use, the products can be dispersed on a finely divided adjuvant solid and employed as dusts. Also, such resulting mixtures can be dispersed in water with the aid of a wetting agent and the further resulting aqueous suspensions employed as sprays. In other procedures the products can be employed as constituents of organic liquids, oil-in-water or water-in-oil emulsions, or water dispersions with or without the addition of wetting, dispersing or emulsifying agents. In representative operations, aqueous compositions containing 500 parts of 2,2,2-tribromo-N-tert-butylacetamide as sole toxicant per million parts by weight of ultimate composition give 100 percent control of housefly (*Musca domestica*) and American cockroach (*Periplaneta americana*) to which a thorough wetting application of the compositions is made.

A preferred group of compounds according to the present invention comprises those compounds of the formula $$X-N(H)-C(=O)-C(Br)_2-Br$$

wherein X is an alkyl group of from two to eight, inclusive, carbon atoms. The compounds of this preferred group give excellent results when employed, as hereinbefore discussed, for the control of plant organisms, that is, as herbicides. In particular, excellent controls of Japanese millet are obtained with the compounds of this preferred group.

The compounds of this preferred group also give excellent results when employed, as hereinabove discussed, for the control of insect organisms, that is, as insecticides. In particular, excellent controls of *Musca domestica*, *Tribolium confusum*, and *Periplaneta americana* are obtained with the compounds of this preferred group.

The tribromoacetyl halide to be employed as a starting material according to the teaching of the present invention is prepared in known methods. For example, tribromoacetic acid is reacted with an inorganic acid halide such as thionyl chloride, phosphorus trichloride, or phosphorus tribromide. In such procedure the reactants are mixed together at room temperature for a period of time with the production of the desired product and phosphorus acid byproduct. The tribromoacetyl halide product is separated and purified according to conventional procedures.

We claim:
1. A compound of the formula

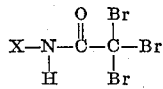

wherein X is alkyl of from two to eight, inclusive, carbon atoms.
2. 2,2,2-tribromo-N-ethylacetamide.
3. 2,2,2-tribromo-N-isopropylacetamide.
4. 2,2,2-tribromo-N-tert-butylacetamide.
5. 2,2,2-tribromo-N-hexylacetamide.
6. 2,2,2 - tribromo - N - 1,1,3,3 - tetramethylbutylacetamide.

References Cited by the Examiner
UNITED STATES PATENTS
2,293,454  8/42  D'Alelio _____ 260—561 X
2,419,888  4/47  Nolan et al. _____ 260—561 X OTHER REFERENCES
Biltz: Jour. Prakt. Chem., vol. 142, pages 193–195 (1935).
Cramer et al.: Chemische Berichte, vol. 94, No. 4, pages 976–982 (1961).

WALTER A. MODANCE, *Primary Examiner*.